Oct. 15, 1940.  E. A. CORBIN, JR  2,217,835
VALVE
Filed Oct. 18, 1938
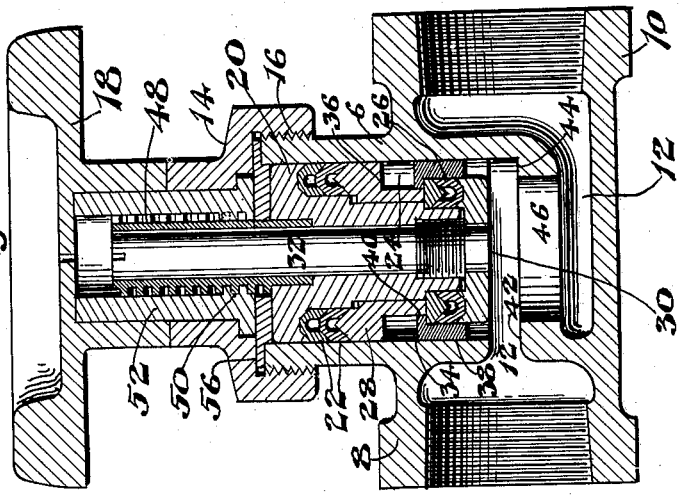
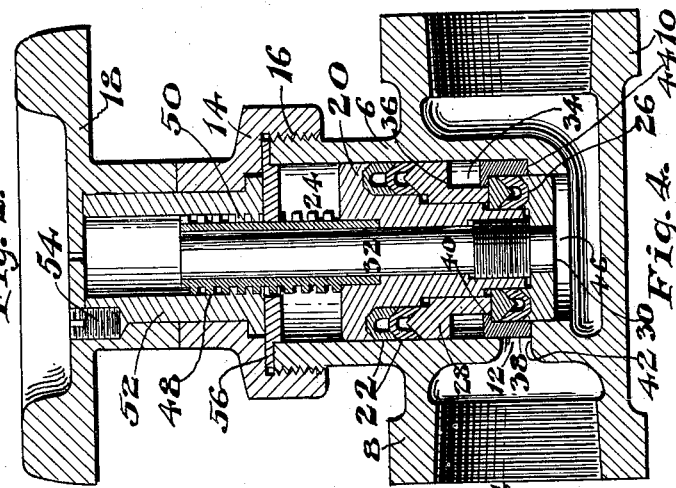
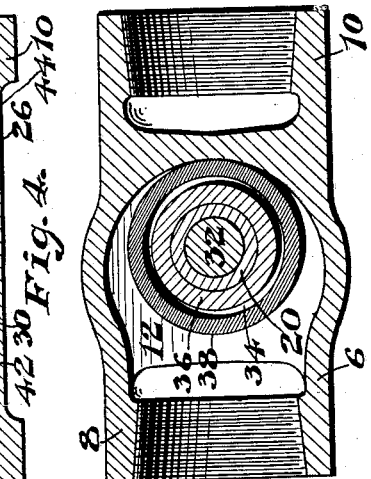
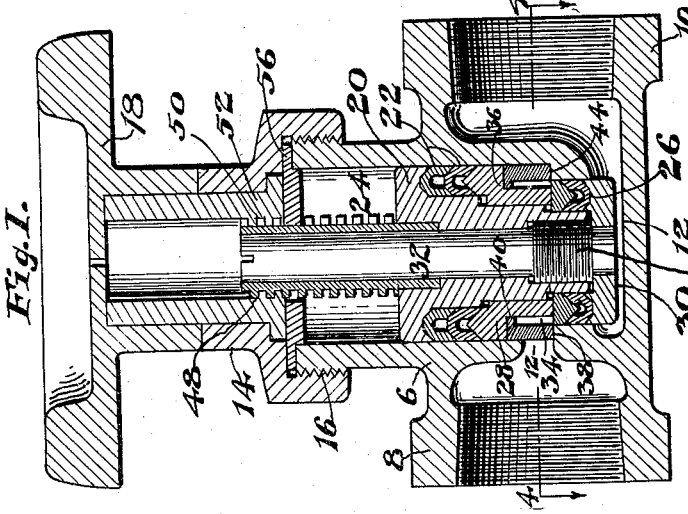
INVENTOR
Elbert A. Corbin Jr.
BY
Louis Nechs
ATTORNEY Patented Oct. 15, 1940

2,217,835

UNITED STATES PATENT OFFICE 2,217,835

VALVE

Elbert A. Corbin, Jr., Lansdowne, Pa., assignor of one-half to William C. Biddle, Lansdowne, Pa.

Application October 18, 1938, Serial No. 235,671

1 Claim. (Cl. 277—29)

My invention relates to a new and useful valve and it relates more particularly to a valve having a movable guard associated with the piston, or plunger part of said valve to protect the part of the piston which is ordinarily subject to corrosion by the steam or other fluid pressure which is to be controlled by virtue of the movement of the valve piston into or out of total or partial registration with the opening through which said steam or other fluid is to be admitted or shut off.

In valves used for controlling openings through which steam or other fluid under high temperature and pressure is adapted to pass the valve piston itself, or the packings thereon, due to the corrosive action to which they are subjected, tend to be damaged in a relatively short period of time thus necessitating costly replacement and loss due to interruption of service. According to my invention this disadvantage is obviated and the life of the valve is greatly prolonged.

In the accompanying drawing:

Fig. 1 represents a vertical, sectional view of a valve assembly embodying my invention shown in the completely closed position.

Fig. 2 is a view similar to Fig. 1 showing the valve in the process of being withdrawn into the open position.

Fig. 3 represents a view similar to Figs. 1 and 2 showing the valve in the completely open position.

Fig. 4 represents a section on line 4—4 of Fig. 1.

Referring to the drawing in which like reference characters indicate like parts 6 designates a casing having an inlet 8 and an outlet 10 communicating through the throat or passage 12. The casing 6 is provided with the cover 14 which is threaded at 16, and on which is mounted the hand wheel or other operating means 18. Within the valve casing 6 is positioned the valve piston 20 which is provided with a recess in which are mounted the annular gaskets 22 and 26 which are of the chevron type so that they tend to flare outwardly against the side walls of the valve chamber 24 under pressure. The packings 22 and 26 are disposed along the opposite ends of the retaining ring 28 and the valve piston 20 is actuated by the stem 32, which is operatively connected to the hand wheel 18 in a manner hereinafter described. In order to adjustably tighten the packings 22 and 26 I have threaded the lower end of the stem 32 to the piston 20 as at 33 and I have secured to the lower end of the stem 32 the retaining plate 30, so that, when the stem 32 is turned such as by a screw driver engaging the upper slotted end thereof, or similar means, the piston 20 is brought closer to or removed from the plate 30 and thus affecting the packings 22 and 26 accordingly. The ring 28 is provided with a recess 34 which is formed by a reduction of the external diameter of the lower portion of the ring 28, the upper edge of the recess 34 constituting a shoulder 36. 38 designates a loosely mounted sleeve which has the inwardly deflected flange 40. When the piston 20 is in its closing position as shown in Fig. 1, the shoulder 36 of the ring 28 bears against the top flange 40 of the sleeve 38 and presses the latter down against the edge 42 of the throat 12 as well as against the shoulder 44 formed in the body of the casing 6. In this position the impact of steam or other fluid pressure entering through the inlet 8 is against the external surface of the sleeve 38 and is kept out of contact with the body of the piston 20 or the annular packings 22 and 26. As the piston 20 is moved upwardly as shown in Fig. 2 the upper edge of the annular packings 26 which projects into the recess 34, engages the flange 40 of the sleeve 38, and, as the valve piston 20 is raised upwardly, the sleeve 38 is raised also to clear the throat 12 and thus establish communication between the inlet 8 and outlet 10. As the valve piston 20 is lowered the shoulder 36 again presses the sleeve 38 into the position shown in Fig. 1. It will be noted that the packing 26 is at all times protected by the sleeve 38 during the movement of the piston 20 past or across the throat 12 and by this means, even if the inner surface or wall 46 of the lower portion of the valve chamber 24 is pitted or corroded, the packing 26, due to being protected and hence retained in its effective condition, will successfully expand to provide a tight connection and to compensate for the pitting or corrosion which may occur.

While any suitable means may be utilized for raising or lowering the piston 20, I have, in the present construction, shown a preferred form in which I provide the externally threaded sleeve 48 which engages the threaded portion 50 of the sleeve 52, the latter being suitably keyed for rotation with the hand wheel 18 as at 54. By turning the hand wheel 18 in the desired direction, the valve piston is raised or lowered partially or wholly, completely or partly to close the throat 12.

Having thus described my invention, what I claim as new and desire to secure by Letters Patent is:

A valve construction comprising a casing having a valve chamber formed therein, an inlet leading into said valve chamber, an outlet leading from said valve chamber, the portion of said valve chamber above said inlet being of uniform but relatively large diameter and the portion of said valve chamber below said inlet being of uniform but relatively small diameter, whereby an inwardly extending annular shoulder is formed at the bottom edge of said inlet, a valve piston reciprocable in said valve chamber and having an upper portion of a uniform and relatively large diameter and a lower portion of a uniform but relatively small diameter, whereby an upper shoulder is formed at the junction of said upper and lower portions of said piston, a guard sleeve loosely surrounding the lower reduced portion of said piston and having an inwardly extending annular flange abutting against said lower portion of said piston, said guard sleeve being adapted when in its lower position to rest on the shoulder at the lower edge of said inlet, and an outwardly extending annular shoulder carried by the lower portion of said piston and adapted to engage the annular flange of said guard sleeve for raising the latter when said piston is raised past said inlet, the shoulder at the junction of the upper and lower portions of said piston being adapted to engage the upper end of said guard sleeve to depress the latter when said piston is lowered.

ELBERT A. CORBIN, Jr.